(12) United States Patent
Lacaille et al.

(10) Patent No.: US 12,705,986 B2
(45) Date of Patent: Aug. 11, 2026

(54) COMPUTING ENVIRONMENT SYSTEM FOR MONITORING AIRCRAFT ENGINES

(71) Applicant: SAFRAN AIRCRAFT ENGINES, Paris (FR)

(72) Inventors: Jérôme Henri Noël Lacaille, Moissy-Cramayel (FR); Florent Evariste Forest, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 641 days.

(21) Appl. No.: 17/299,249

(22) PCT Filed: Dec. 5, 2019

(86) PCT No.: PCT/FR2019/052935
§ 371 (c)(1),
(2) Date: Jun. 2, 2021

(87) PCT Pub. No.: WO2020/115440
PCT Pub. Date: Jun. 11, 2020

(65) Prior Publication Data

US 2022/0076581 A1 Mar. 10, 2022

(30) Foreign Application Priority Data

Dec. 7, 2018 (FR) ...................................... 1872520

(51) Int. Cl.
*G06N 20/00* (2019.01)
*B64D 45/00* (2006.01)
(Continued)

(52) U.S. Cl.
CPC ............... *G08G 5/30* (2025.01); *B64D 45/00* (2013.01); *G06N 20/00* (2019.01); *G08G 5/25* (2025.01); *B64D 2045/0085* (2013.01)

(58) Field of Classification Search
CPC ............ B64D 2045/0085; B64D 45/00; G05B 2219/45071; G05B 23/0221; G06F 8/60; G06N 20/00; G08G 5/0008; G08G 5/003
See application file for complete search history.

(56) References Cited

U.S. PATENT DOCUMENTS 9,176,926 B2 11/2015 Lacaille
9,454,855 B2 * 9/2016 Ahn ....................... G07C 5/008
(Continued)

FOREIGN PATENT DOCUMENTS

EP 2 676 176 A1 12/2013
EP 2 817 688 A1 12/2014
(Continued)

OTHER PUBLICATIONS

Machine Translation of FR2971595A1 obtained from Clarivate Analytics on Oct. 19, 2023 (Year: 2012).*
(Continued)

*Primary Examiner* — Naeem Taslim Alam
*Assistant Examiner* — Michael J Herrera
(74) *Attorney, Agent, or Firm* — Oblon, McClelland, Maier & Neustadt, L.L.P.

(57) ABSTRACT

A computing environment system for monitoring aircraft engines, the system being connected to a cluster of servers, the system including an application interface configured so as to receive user codes that are developed independently from a distributed deployment system specifying the calculation of a set of indicators relating to an aircraft engine for deployment on a fleet of aircraft engines; an extraction module configured so as to extract the indicators by deploying parallel calculations on temporal flight data from the fleet of aircraft engines and stored in a database distributed over the cluster of servers; a learning module configured so as to use the indicators to construct, without supervision,
(Continued)

from the indicators, a monitoring model representative of the indicators by implementing predetermined learning functions.

8 Claims, 3 Drawing Sheets

(51) Int. Cl.
*G08G 5/25* (2025.01)
*G08G 5/30* (2025.01)

(56) References Cited

U.S. PATENT DOCUMENTS

| | | | | |
|---|---|---|---|---|
| 9,686,086 | B1 | 6/2017 | Nguyen et al. | |
| 9,734,722 | B1 * | 8/2017 | Markey | G08G 5/0013 |
| 9,754,429 | B2 | 9/2017 | Lacaille et al. | |
| 9,792,741 | B2 | 10/2017 | Rabernoro et al. | |
| 9,816,970 | B2 | 11/2017 | Lacaille | |
| 10,110,390 | B1 | 10/2018 | Nguyen et al. | |
| 10,115,245 | B2 | 10/2018 | Lacaille et al. | |
| 10,185,930 | B1 | 1/2019 | Nguyen et al. | |
| 10,229,148 | B1 | 3/2019 | Nguyen et al. | |
| 10,239,640 | B2 * | 3/2019 | Ethington | G07C 5/0841 |
| 10,432,258 | B1 * | 10/2019 | Mitchell | B60L 53/30 |
| 11,295,229 | B1 * | 4/2022 | Kumar | G06N 20/00 |
| 2006/0224357 | A1 * | 10/2006 | Taware | G07C 5/085 702/179 |
| 2007/0078585 | A1 * | 4/2007 | Pomeroy | G01C 23/00 701/100 |
| 2010/0076714 | A1 * | 3/2010 | Discenzo | H02N 2/181 310/319 |
| 2013/0268501 | A1 | 10/2013 | Gorinevsky | |
| 2013/0325286 | A1 | 12/2013 | Lacaille | |
| 2015/0234951 | A1 * | 8/2015 | Andersson | G06F 30/20 703/2 |
| 2016/0107768 | A1 * | 4/2016 | Nicks | B64F 5/60 702/183 |
| 2017/0233104 | A1 * | 8/2017 | Bolling | B64F 5/60 701/2 |
| 2017/0308802 | A1 * | 10/2017 | Ramsøy | G06N 20/00 |
| 2017/0323274 | A1 | 11/2017 | Johnson et al. | |
| 2017/0352204 | A1 | 12/2017 | Huet et al. | |
| 2017/0370790 | A1 * | 12/2017 | Hettler | F01D 21/003 |
| 2018/0031504 | A1 * | 2/2018 | Ricci | G01N 33/2858 |
| 2018/0101583 | A1 | 4/2018 | Li et al. | |
| 2018/0253664 | A1 | 9/2018 | Rabernoro et al. | |
| 2018/0350166 | A1 * | 12/2018 | Calkins | G07C 5/0808 |
| 2019/0025813 | A1 * | 1/2019 | Cella | G06F 18/2178 |
| 2019/0228002 | A1 | 7/2019 | Nguyen et al. | |
| 2020/0408106 | A1 * | 12/2020 | Karnofski | F01D 23/00 |
| 2022/0014260 | A1 * | 1/2022 | Fanton | H04B 7/18506 |
| 2022/0101733 | A1 * | 3/2022 | Dunlay | G08G 5/0056 |

FOREIGN PATENT DOCUMENTS

| | | | | |
|---|---|---|---|---|
| EP | 2 912 526 | B1 | 12/2017 | |
| EP | 3 039 497 | B1 | 8/2018 | |
| EP | 3 025 205 | B1 | 9/2018 | |
| FR | 2971595 | A1 * | 8/2012 | B64F 5/60 |
| FR | 3 052 273 | A1 | 12/2017 | |
| WO | WO 2012/110733 | A1 | 8/2012 | |
| WO | WO 2013/124591 | A1 | 8/2013 | |
| WO | WO 2017/046530 | A1 | 3/2017 | |

OTHER PUBLICATIONS

International Search Report issued May 19, 2020 in PCT/FR2019/052935 filed Dec. 5, 2019, citing documents AA-AC, AJ-AL, AM, AV, BA, BB and AX-AZ therein, 3 pages.

Penchikala, S., "Big Data Processing with Apache Spark—Part 5: Spark ML Data Pipelines", XP055647089 and XP055647112, 2016 and 2019, 21 total pages.

Murugan, A., et al., "Big Data Infrastructure for Aviation Data Analytics", XP032726702, 2014, 6 total pages.

Florest, F., et al., "A Generic and Scalable Pipeline for Large-Scale Analytics of Continuous Aircraft Engine Data", XP033508269, 2018, IEEE International Conference on Big Data (Big Data), pp. 1918-1924.

Combined Russian Office Action and Search Report issued Apr. 4, 2022, in corresponding Russian Patent Application No. 2021115965/28(033685) (with English Translation), 10 pages.

Combined Chinese Office Action and Search Report issued May 11, 2023, in corresponding Chinese Patent Application No. 201980081084.7 (with English Translation and English Translation of Category of Cited Documents) citing document 1 therein, 14 pages.

Combined Chinese Office Action and Search Report issued Feb. 5, 2024, in corresponding Chinese Patent Application No. 201980081084.7 (with English Translation and English Translation of Category of Cited Documents) citing document 1 therein, 11 pages.

* cited by examiner 25a
26
25b
F1
F2
19
13
15
17
F3
11
23
21
9
27
12
1
1
7
7
3
3
5

COMPUTING ENVIRONMENT SYSTEM FOR MONITORING AIRCRAFT ENGINES

FIELD OF THE INVENTION

The present invention relates to the field of monitoring aircraft engines. In particular, the invention relates to a computing environment system for monitoring aircraft engines.

Aeronautics engineers specialised in each of the fields of operation of engines develop algorithms for monitoring the latter when they are in operation. These algorithms use precise knowledge of the operation of the engines and make it possible to predict events before a breakdown occurs. This process is called "prognostic and health-monitoring".

Indeed, during each flight, an aircraft proceeds with the recording of flight, context and operation data, from sensors and computers associated with the engines and with other systems of the aircraft. This data provides important information as to the proper unfolding of the flight and it can be used to detect a possible anomaly.

However, the fleet of engines that has to be monitored is now too large for a specific analysis by each operator. The flight data from the different aircrafts is thus systematically downloaded and stored on a distributed computing support (for example, of the Hadoop type) where the monitoring codes can be executed in parallel systematically.

However, the execution in parallel of computer codes requires particular skills in distributed programming and good knowledge of the operation of computing clusters. However, aircraft engine engineers are in general specialists in thermodynamics and mechanics and do not have this type of skills which are left to specialists in distributed computing programming.

Generic platforms exist such as Datalku that can assist with the development of new codes. However, this type of tools is not specialised in the processing of monitoring aircraft engines and is not able to produce operational solutions and these are development tools, not application platforms.

The object of the present invention is, consequently, a method and a system for monitoring that allows engineers without any knowledge of distributed computing to continue developing their codes with languages that they master on small data sets to then deploy them operationally on all engines and flights.

OBJECT AND SUMMARY OF THE INVENTION

The present invention relates to a computing environment system for monitoring aircraft engines, said system being connected to a cluster of servers, said system including:

- an application interface configured so as to receive user codes developed independently from the distributed deployment system specifying the calculation of a set of indicators relating to an aircraft engine for deployment on a fleet of aircraft engines,
- an extraction module configured so as to extract said indicators by deploying parallel calculations on temporal flight data from the fleet of aircraft engines and stored in a database distributed over said cluster of servers,
- a learning module configured so as to use said indicators to construct, without supervision, from said indicators, a monitoring model representative of the indicators by implementing predetermined learning functions.

This system allows engineers to implement and to use their own indicator extraction algorithms without any knowledge of the architecture of the cluster of servers or of distributed calculations. The system thus makes it possible to process in parallel and in a scalable way a very large quantity of flight and engine data while still using generic functions and algorithms that already exist to calculate the indicators and construct a representation model that makes it possible to identify trends or to rank engines in order to determine which ones are to be maintained in priority. Thus, it is possible to monitor a fleet of aircraft engines so as to predict and schedule maintenance operations with great precision.

Advantageously, the extraction module includes a sequencing mechanism configured to implement any recurrences in the extraction of the indicators that are specific to each flight and to each engine. This makes it possible to reuse the indicators that have already been extracted to calculate new indicators in a recurring manner.

According to the present invention, said indicators include health indicators and corresponding context indicators. Advantageously, the extraction module is configured to standardise said health indicators according to the corresponding context indicators by implementing regression techniques. The health indicators are rendered independent of the context which thus makes it possible not only to monitor the change in each engine but also to compare them.

Advantageously, the computing environment system includes a visualisation module comprising graphics tools configured to represent the monitoring model according to statistical representations. This makes it possible to analyse the results and to compare engines or fleets or to observe the individual trends or average trends over a fleet or to categorise the various engines monitored.

Advantageously, the user codes include specifications of input data to be processed in parallel and output data comprising context and health indicators, said user codes being described in any language chosen from parallel languages of the Spark type as well as business languages of the Scala, Python, or R type.

Advantageously, the temporal flight data is continuous operating data of the engine from sensors and computers associated with the aircraft engines as well as continuous data from aircraft, said temporal flight data being stored in a system of files distributed over said cluster of servers. This makes it possible to store and process a very large volume of flight data.

Advantageously, the computing environment system includes a first pre-processing module configured to form temporal vectors by aggregating said temporal data flight by flight. This makes it possible to reduce the number of lines and consequently, to accelerate the processing of the data.

Advantageously, the indicators extracted by the extraction module are stored in a data structure deployed over the cluster of servers. This facilitates the processing of the indicators used for the construction of the representation model while still allowing them to be visualised and to be reused to calculate new indicators.

Advantageously, the computing environment system includes a second pre-processing module configured to transform the vector format of the indicators into a matrix format adapted to the application of learning functions.

Advantageously, the predetermined learning functions include learning algorithms from the following algorithms: Kohonen self-adapting mapping algorithms, anomaly detection algorithms, trend detection and tracking algorithms, algorithms for analysing the operation of a piece of equipment or of a specific system of aircraft engine, and event anticipation or prognostic algorithms.

The invention also relates to a method for monitoring aircraft engines including the following steps:

- receiving user codes specifying the calculation of a set of indicators relating to an aircraft engine for deployment on a fleet of aircraft engines,
- extracting said indicators by deploying parallel calculations on temporal flight data from the fleet of aircraft engines and stored in a database distributed over a cluster of servers,
- using said indicators to construct, without supervision, from said indicators a monitoring model representative of the indicators by implementing predetermined learning functions.

The invention also relates to a computer program including code instructions for the implementation of the method for monitoring hereinabove when it is executed on the computing environment system according to any of the characteristics hereinabove.

BRIEF DESCRIPTION OF THE DRAWINGS

Other particularities and advantages of the device and of the method according to the invention shall appear better when reading the description given hereinafter, for the purposes of information but not in a limiting manner, in reference to the accompanying drawings wherein.

DETAILED DESCRIPTION OF EMBODIMENTS

The principle of the invention consists of proposing a computing environment that will encapsulate the business codes developed by engineers in order to have them operate in a distributed manner over a multitude of servers.

Figure 1:
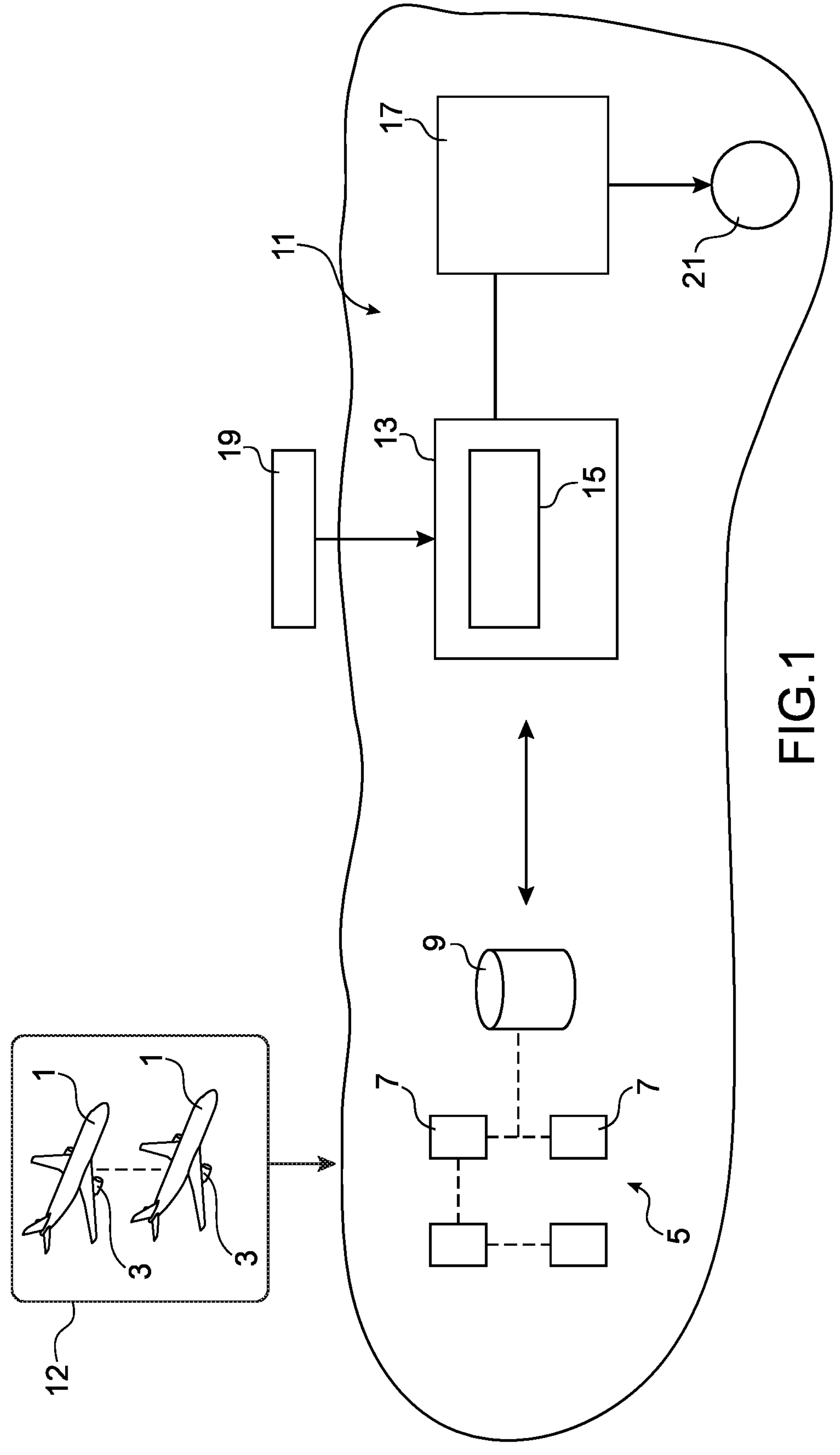
FIG. 1 diagrammatically shows a computing environment system for monitoring aircraft engines, according to an embodiment of the invention.

FIG. 1 diagrammatically shows a computing environment system for monitoring aircraft engines, according to an embodiment of the invention.

Currently, a very large volume of raw temporal data acquired continuously by the various engines and aircraft is available. Indeed, during each flight, each aircraft 1 proceeds with recording information on its operation as well as on different environmental parameters. This data recorded by the onboard computers (for example, FADEC, ACMS) on various supports and formats (DAR, QAR, CEOD, etc.) come from measurements provided by probes or sensors integrated into the engines 3 of aircraft as well as in other systems of the aircraft 1. For example, the FADEC (which controls the engine) records the data measured by sensors integrated into the engine 3 making it possible to both control the engine 3 and to be used as a basis for a procedure for monitoring and for predictive maintenance. More particularly, at each acquisition, the data comprises a first set of data on endogenous variables describing the behaviour of the engine 3 as well as other entities of the aircraft 1 and a second set of data on exogenous variables describing the acquisition context.

By way of example, the endogenous variables can comprise the rotation speed N2 of the engine 3 core shaft, the flow rate of the fuel, the temperatures and pressures of fluids at different locations of the engine (for example, before and/or after compression), the exhaust gas temperature (EGT), etc.

The exogenous variables can comprise the following variables: outside temperature, altitude, weight of the aircraft, de-icing of the wings, de-icing of the nacelle, air intake, variable geometries, VBV (variable bleed valve), VSV (variable stator valve), LPTACC and HPTACC (Low/High Pressure Turbine Active Clearance Control), HP compressor opening, ECS air intake (environmental control system, air conditioning), required rotation speed of fan N1 (corresponding to the desired thrust of the engine), TLA (Thrust Lever Angle), speed of the aircraft (Mach number), etc. The endogenous (descriptions of the behaviour of a system) and exogenous (descriptions of the acquisition context) variables can be chosen by the user according to the system monitored by the calculated indicator.

All of this endogenous and exogenous temporal data is continuously recorded on the computer of the engine or on a central computer of the aircraft 1. Then, this temporal data is systematically downloaded and stored in means of storage on the ground to constitute a database on the entire fleet of engines 3 and on all the flights.

So as to process this very large volume of data, a distributed storage system is used, for example of the Hadoop type, which makes it possible to capitalise all the temporal flight data of a fleet of aircraft engines by carrying out parallel data processing on a set 5 (called a "cluster") of servers 7.

Thus, a large volume of raw temporal data acquired by the various engines 3 and aircraft 1 is stored in a database 9 distributed over the various servers 7. For example, this flight data is stored systematically over a distributed file system of the cluster 5 of servers 7. As this data arrives over the course of time, a storage procedure that optimises acquisition is advantageously set up. This procedure represents the data in a highly redundant manner, but in a very generic manner by associating with it for example the following values: the weather, the serial number of the engine, and the parameter measured or calculated by the onboard computer. In order to make this representation suitable for analytical processing, it is transformed into a vector structure. This procedure generates distributed tables on the servers 7 but where each parameter is represented by a temporal vector (i.e. a curve) for each flight.

In order to use and run algorithms for monitoring aircraft engines 3 that already exist on this large volume of data, the present invention proposes to use an algorithm distribution platform. This platform, called computing environment system 11, is connected to a distributed deployment system including a cluster 5 of servers 7, on which the temporal flight data concerning a fleet 12 of aircraft 1 engines 3 is stored in a distributed manner. The cluster 5 of server 7 can be grouped into a set of compute nodes, each one able to be constituted of a large number of servers 7 for which the size can be adapted according to need.

In accordance with the invention, the computing environment system 11 includes an application interface 13, an extraction module 15, and a learning module 17.

The application interface 13 is configured so as to receive user codes 19 developed independently from the distributed deployment system specifying the calculation of a set of indicators relating to an aircraft engine. These user codes 19 (which can be business codes of the Scala or Python or R type implemented by engineers who have no knowledge of distributed calculations) are deployed in order to have them operate in a distributed manner over the data of the entire fleet 12 of aircraft 1 engines 3.

Indeed, the extraction module 15 is configured to extract the indicators by deploying parallel calculations in the cluster 5 of servers over the temporal flight data (more particularly, the flight vectors) from the entire fleet 12 of aircraft engines stored in the database 9 distributed over the cluster 5 of servers 7.

Furthermore, the learning module 17 is configured to use the indicators extracted by the extraction module 15 so as to construct, without supervision, a monitoring model 21 representative of these indicators by implementing predetermined learning functions such as, for example, Kohonen self-adapting mapping functions to construct the monitoring model. This monitoring model makes it possible for example to identify trends or rank the engines.

The computing environment system 11 makes it possible to ingest the specific codes 19 developed by engineers without them having to be concerned about the distribution of the servers 7 and of the data. Thus, an aeronautics engineer can continue proposing tools that they will test on small data sets before injecting them into the computing environment system 11 in order to distribute them to all engines 3 and flights. Furthermore, this system 11 makes it possible to encapsulate the user codes in order to have them operate in a distributed manner without the computing specialist needing to modify them.

Figure 2:
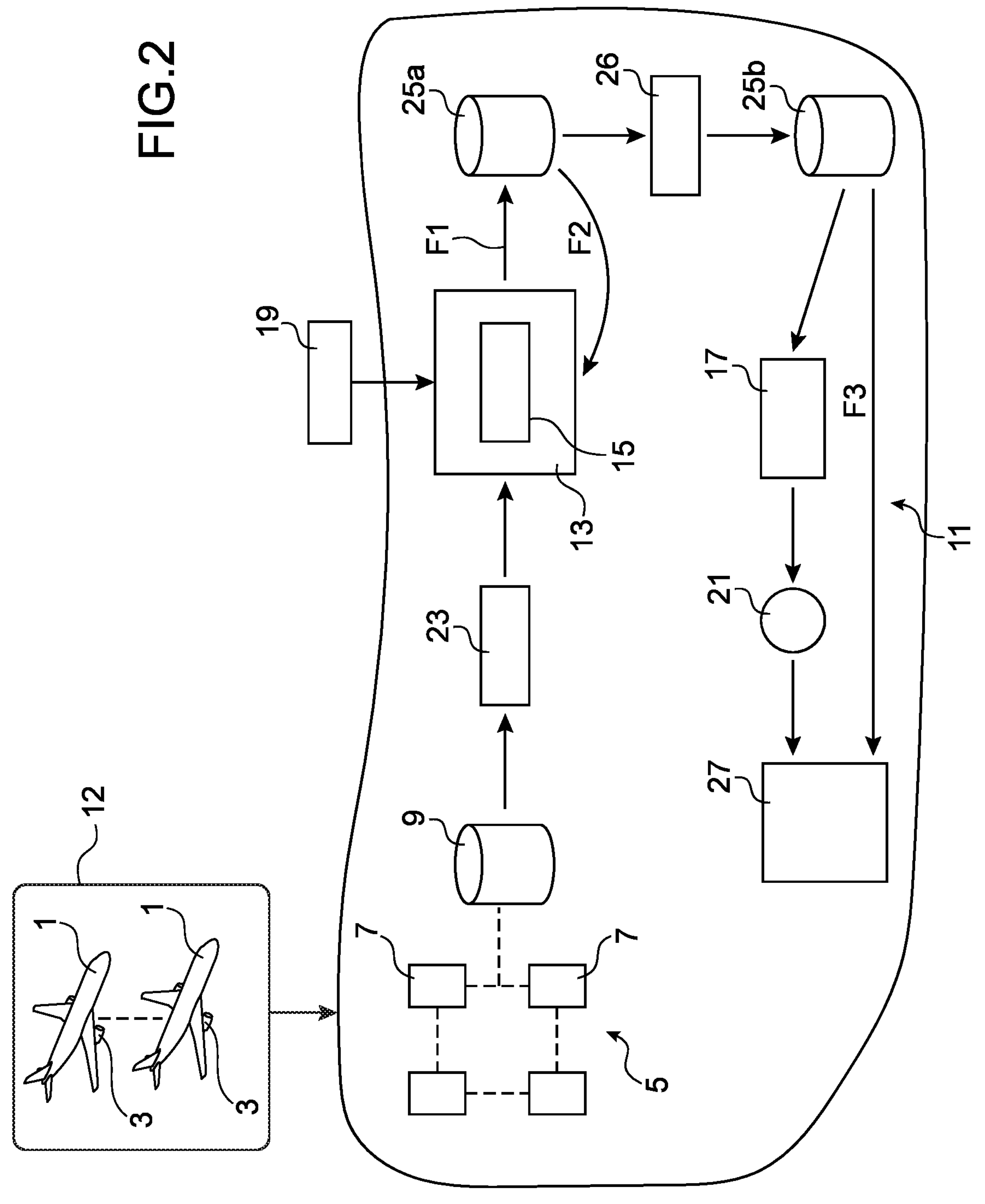
FIG. 2 diagrammatically shows a computing environment system, according to a preferred embodiment of the invention.

FIG. 2 diagrammatically shows a computing environment system, according to a preferred embodiment of the invention. As hereinabove, the computing environment system 11 is connected to a cluster 5 of servers 7 comprising a database 9 distributed over which are stored the temporal flight data of a fleet 12 of aircraft 1 engines 3. According to this embodiment, the computing environment system 11 includes a first pre-processing module 23, an application interface 13, an extraction module 15, data storage structures 25*a*, 25*b*, a second pre-processing module 26, a learning module 17, and a visualisation module 27.

The first step in monitoring an aircraft engine 3 is to determine a set of indicators representative of the state of health of the engine 3 or of a sub-system of the engine (for example, level of oil, fuel consumption, control system, etc.). Such indicators can be as simple as the value of a parameter at a specific moment of the flight, but they can also be more complex functionalities designed by experts.

The calculation of the indicators can be made parallel over the different flights and therefore process one flight at a time. It is also possible to process the calculation of the indicators over a group of flights at a time (for example, all the flights of an engine or over a time window of the last N flights of an engine, etc.).

Note that the calculations performed for the extraction of the indicators will have to process the temporal series of a flight parameter as a whole. Indeed, the smallest entity to be processed in parallel is a parameter during an entire flight. It is, consequently, not necessary to have a line per "step" of time.

Thus, the first pre-processing module 23 is configured to pre-process the temporal series of flight data by aggregating them over the temporal dimension in order to form temporal vectors. This pre-processing can be carried out by using the "collect list" aggregation operation of the Spark SQL language. This makes it possible to substantially decrease the number of data lines (for example, from about 500 billion lines to only 5 million lines). Advantageously, this operation can be executed only once on the new incoming data flight by flight.

The application interface 13 is configured so as to receive the user codes 19 including specifications of input data to be processed in parallel and of output data comprising the context and health indicators.

Furthermore, the extraction module 15 (represented as being included in the application interface 13) is configured to extract the indicators by performing parallel calculations on the temporal vectors from data stored in the database 9 distributed over the cluster 5 of servers 7.

The indicators representing the various flights by engine extracted by the extraction module 15 are stored in the data storage structure 25*a* which can also be deployed over the cluster 5 of servers 7.

Moreover, the extraction module 15 includes a sequencing mechanism configured to implement any recurrences in the extraction of the indicators specific to each flight and to each engine. This mechanism is represented by the loop (arrows F1 and F2) between the extraction module 15 and the data storage structure 25*a*.

Indeed, an indicator can be calculated in two steps because it is easier or because an intermediate result is required. It is also possible that an indicator depends on the value that it had, or that other indicators had, during preceding flights.

Note that the indicators extracted by the extraction module 15 include health indicators and corresponding acquisition context indicators. Advantageously, the extraction module 15 is configured to standardise the health indicators according to the corresponding context indicators. This standardisation is carried out by using regression techniques that make use of learning tools that use datasets that are specific to the engines 3 and aircraft 1.

More particularly, the health indicators can be standardised according to a regression model over a space of context variables generated by analytical combinations of context indicators. This processing which consists of using a regression model on additional context variables constructed for example from polynomial, exponential and logarithmic or other transformations of the initial context indicators makes it possible to effectively suppress the influence of the acquisition context (i.e. the environmental effects and the setpoints) on the health indicators that describe the states of the engines 3.

Advantageously, standardisation can be followed by a filtering and cleaning of noise on the standardised health indicators by using a smoothing tool and a tool for detecting abrupt changes. Thus, the health indicators are rendered independent of the context making it possible, consequently, to compare them over different flights and engines and therefore among other things to monitor the change in each engine 3.

Figure 3:
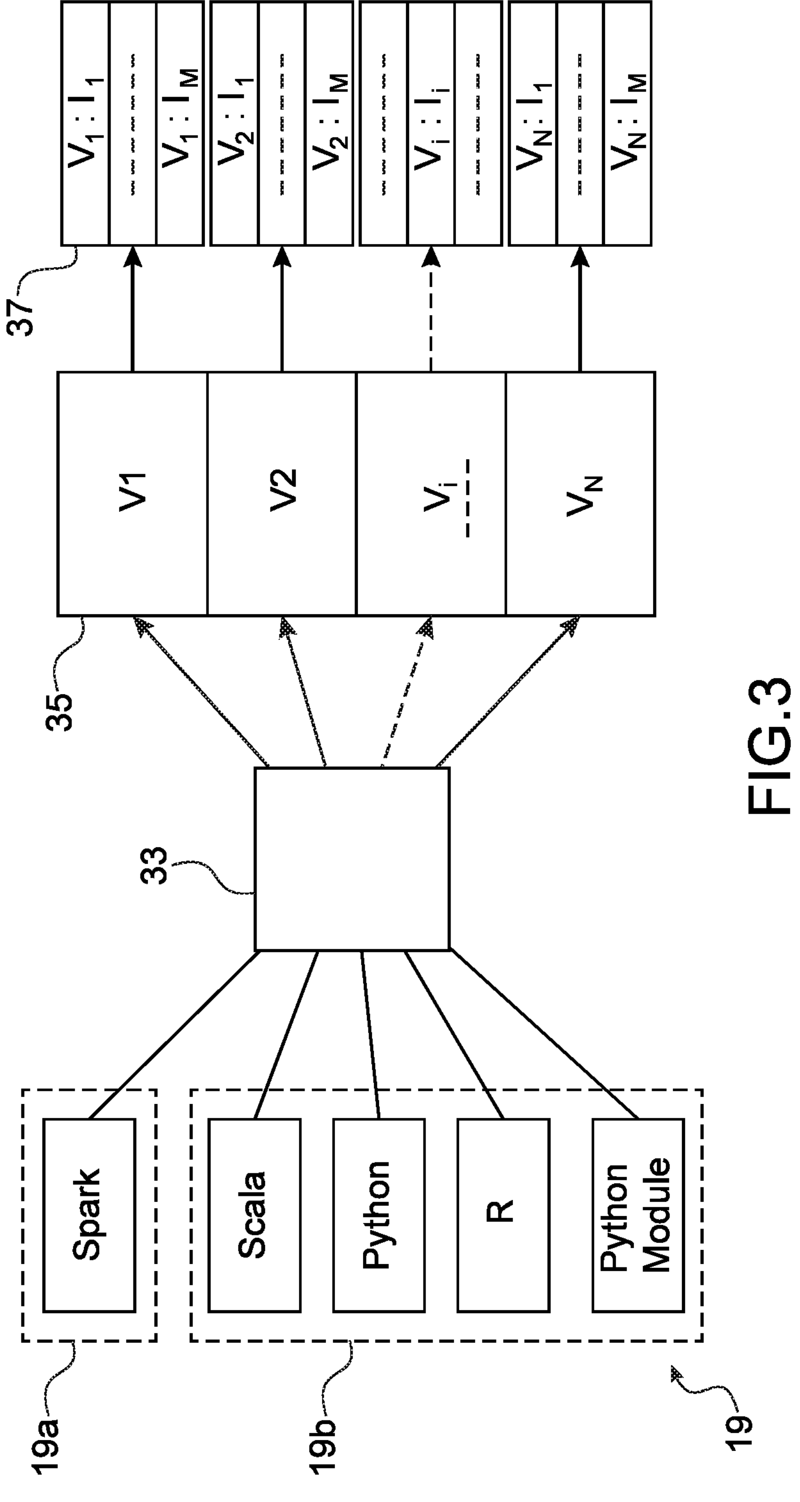
FIG. 3 diagrammatically shows a system for interfacing and extracting indicators according to the embodiment of FIG. 2.

FIG. 3 diagrammatically shows a system for interfacing and extracting indicators according to the embodiment of FIG. 2. This system for interfacing and extracting includes an application programming interface 33 API representing the application interface 13 and the extraction module 15 of FIG. 2. The application programming interface 33 API can handle several types of user codes 19. The user codes 19 can be described in a parallel language 19*a* of the Spark type. Spark code is a native language that makes it possible to optimise the performance of the distributed calculation. Furthermore, users who are familiar with programming in Spark can write personalised Spark functions.

Advantageously, the user codes 19 can be developed in local object languages 19*b* (i.e. non-distributed) of the Scala, Python, or R type making it possible to execute analytical processing. Digital libraries for analysing data and automatic learning can be used to define any type of algorithm with these business languages. The application programming interface API can also handle codes formatted as modules of the Python module type.

However, these codes can be called simultaneously over several compute nodes of the cluster 5 of servers 7. Thus, the application programming interface 33 is configured to encapsulate these codes allowing them to operate identically in different data domains.

More particularly, the application programming interface 33 API is configured to automatically deploy the user codes 19 over all the compute nodes of the servers 7 that manage all the flight data in such a way that these user codes 19 will execute in a distributed manner over the various servers 7. The results 35 at the output of the application interface 33 are distributed according to the different groups of flights referenced as $V_1, \ldots V_N$. Then, these results 35 are cross-referenced to form vectors of indicators 37 for each flight $V_I$ ($V_1$:$I_1$-$I_M$; . . . ; $V_N$: $I_1$-$I_M$).

The application programming interface 33 thus makes it possible to extract the indicators in a distributed manner and according to data in parallel, which makes it possible to process a large number of flights and engines 3 in parallel. Furthermore, it allows for the use of generic functions and of algorithms that already exist to calculate these indicators. Thus, engineers are able to implement and use their own indicator extraction algorithms without any knowledge of the cluster 5 architecture for example of the Hadoop type or of a distributed language of the Spark type.

Moreover, the second pre-processing module 26 of the computing environment system 11 is configured to transform the vector format 37 of the indicators $I_1$-$I_M$ into a matrix format standard adapted to the application of learning functions. Indicators in matrix format are stored in the data storage structure 25*b* that can also be installed over the cluster 5.

The learning module 17 then retrieves the indicators in matrix format to construct, without supervision, a monitoring model 21 representative of these indicators by using predetermined learning functions.

A highly representative monitoring model 21 is the one carried out by the mapping algorithm of engine states. This algorithm is described in detail in patent application EP2676176 of the applicant. According to this algorithm, health and context indicators are extracted during take-off. After standardisation of the health indicators via the acquisition context, the indicators are filtered and ranked on a Kohonen self-adapting map (Self-Organising Map). This makes it possible to monitor the trajectory of a "performance-state" of the engine (also called "digital twin"), study the trends and position the engines with respect to one another in order to plan maintenance operations better and to assess the degradations and the potential breakdowns of the engines better, making it possible, for example, to know which ones are to be maintained first. Thus, this algorithm makes it possible to map the data relative to the states of the engines independently of the context, to rank the engines according to similar behaviours, and to statistically analyse the events that have occurred on the engines.

In addition to the Kohonen self-adapting mapping algorithms, the predetermined learning functions can include non-exhaustively, "scoring" anomaly detection algorithms, trend detection and tracking algorithms, algorithms for analysing the operation of equipment or of specific systems of aircraft engines (for example analysis of the quantity of oil or the consumption of fuel, ignition analysis, etc.), event anticipation or prognostic algorithms. These algorithms are described in the following patents or patent applications of the applicant: WO2017046530, EP2912526, EP3039497, EP3025205 and EP2817688.

Note that these learning algorithms generally make use of a representation in memory of observations. However, as the number of such observations is very large in a set of servers of the cluster 5 type, thus, in order to adapt these algorithms to the computing environment system 11, these algorithms are rewritten in such a way that the coding makes use of a parallel or iterative mode, not a global processing. In particular, regression tools with reduction in dimension and classification conventionally used to represent the state of the engine 3 are transformed to the scale of the volume of distributed data.

Finally, the visualisation module 27 comprises graphics tools configured to represent the monitoring model 21 according to statistical representations. The visualisation module 27 allows for a display on an offset screen of the user.

Furthermore, as indicated by the arrow F3, the health indicators can also be directly represented by the visualisation module 27.

Visualisation of the model and/or of the health indicators makes it possible to analyse the results and to compare engines or fleets for example by statistical diagrams. It is also possible to use curves to observe the individual trends or the average trends over a fleet 12. It is also possible to categorise the various engines monitored by a list of classes or a map.

The computing environment system 11 thus takes care of offering an interface that makes it possible to record the various codes, program the sequencing and the data selections for the learning and choose the modes for visualising the results. Thus, a user can compare their own results with those that are much more precise coming from the computing environment system according to the invention.

The invention also relates to a computer program, including code instructions adapted to implement a monitoring of aircraft engines according to the embodiments of the invention such as described hereinabove.

The invention claimed is:

1. A computing environment system for monitoring aircraft engines, said system being connected to a cluster of servers, wherein said system comprises:

processing circuitry configured to receive user codes deployed in the server cluster and including specifications of input and output data, said user codes specifying the calculation of a set of indicators representing the health state of an aircraft engine for deployment on a fleet of aircraft engines, the user codes include specifications of input data to be processed in parallel and output data comprising context and health indicators, said user codes being described in at least two different languages chosen from parallel languages of the Spark type as well as business languages of the Scala, Python, or R type, extract, by an application programming interface (API), said indicators by deploying parallel calculations in the server cluster on temporal flight data from the fleet of aircraft engines and stored in a database distributed over said cluster of servers, such that the API is configured to (i) encapsulate the user codes to cause the user codes to operate identically in different data domains and (ii) automatically deploy the user codes a distributed manner over said cluster of servers, use said indicators to construct, without supervision, from said indicators, a monitoring model representative of the indicators by implementing predetermined learning functions, wherein the indicators are filtered and ranked on a map, and the monitoring model maps the indicators relative to states of the engines independently of the context, to rank the engines according to similar behaviours, and display a visual representation of the monitoring model, wherein the temporal flight data is continuous operating data of the engine from sensors and computers associated with the aircraft engines as well as continuous data from aircraft, said temporal flight data being stored in a system of files distributed over said cluster of servers, and the processing circuitry is configured to form the temporal vectors by aggregating said temporal flight data on new incoming data flight by flight without requiring processing of a data line of the temporal flight data per step of time.

2. The system according to claim 1, wherein the processing circuitry implements a sequencing mechanism configured to implement any recurrences in the extraction of the indicators.

3. The system according to claim 1, wherein said indicators include health indicators and corresponding context indicators and wherein the processing circuitry implements is configured to standardise said health indicators according to the corresponding context indicators by implementing regression techniques.

4. The system according to claim 1, wherein the indicators extracted by the processing circuitry are stored in a data structure deployed over the cluster of servers.

5. The system according to claim 1, wherein the processing circuitry is configured to transform the vector format of the indicators into a matrix format adapted to the application of learning functions.

6. The system according to claim 1, wherein the predetermined learning functions include learning algorithms from the following algorithms: Kohonen self-adapting mapping algorithms, anomaly detection algorithms, trend detection and tracking algorithms, algorithms for analysing the operation of a piece of equipment or of a specific system of aircraft engine, event anticipation or prognostic algorithms.

7. A method for monitoring aircraft engines, said method comprising the following steps:

receiving user codes deployed in the server cluster and including specifications of input and output data, said user codes specifying the calculation of a set of indicators representing the health state of an aircraft engine for deployment on a fleet of aircraft engines, the user codes include specifications of input data to be processed in parallel and output data comprising context and health indicators, said user codes being described in at least two different languages chosen from parallel languages of the Spark type as well as business languages of the Scala, Python, or R type, extracting, by an application programming interface (API), said indicators by deploying parallel calculations in the server cluster on temporal flight data from the fleet of aircraft engines and stored in a database distributed over a cluster of servers, such that the API is configured to (i) encapsulate the user codes to cause the user codes to operate identically in different data domains and (ii) automatically deploy the user codes a distributed manner over said cluster of servers, using said indicators to construct, without supervision, from said indicators a monitoring model representative of the indicators by implementing predetermined learning functions, wherein the indicators are filtered and ranked on a map, and the monitoring model maps the indicators relative to states of the engines independently of the context, to rank the engines according to similar behaviours, and displaying a visual representation of the monitoring model, wherein the temporal flight data is continuous operating data of the engine from sensors and computers associated with the aircraft engines as well as continuous data from aircraft, said temporal flight data being stored in a system of files distributed over said cluster of servers, and the method includes forming the temporal vectors by aggregating said temporal flight data on new incoming data flight by flight without requiring processing of a data line of the temporal flight data per step of time.

8. A non-transitory computer readable medium that stores a computer program comprising code instructions for the implementation of the method for monitoring according to claim 7 when said code instructions are executed on the computing environment system.

* * * * *